US012565068B1

(12) United States Patent
Li et al.

(10) Patent No.: US 12,565,068 B1
(45) Date of Patent: Mar. 3, 2026

(54) TRAILER COUPLER LOCK

(71) Applicant: Shuaikang Li, Zhengzhou (CN)

(72) Inventors: Shuaikang Li, Zhengzhou (CN);
Yanfeng Li, Zhengzhou (CN); **Chen
Bian, Zhengzhou (CN); Yonghao Wu**,
Zhengzhou (CN)

(73) Assignee: Shuaikang Li, Zhengzhou (CN)

( * ) Notice: Subject to any disclaimer, the term of this
patent is extended or adjusted under 35
U.S.C. 154(b) by 0 days.

(21) Appl. No.: 19/309,526

(22) Filed: Aug. 25, 2025

(30) Foreign Application Priority Data

Jul. 31, 2025 (CN) ........................ 202521628797.X

(51) Int. Cl.
_B60D 1/60_ (2006.01)

(52) U.S. Cl.
CPC ............... _B60D 1/60_ (2013.01); _B60D 1/605_
(2013.01)

(58) Field of Classification Search
CPC .................................. B60D 1/60; B60D 1/605
USPC ........................................................ 280/507
See application file for complete search history.

(56) References Cited

U.S. PATENT DOCUMENTS

| | | | | |
|---|---|---|---|---|
| 7,543,838 | B2 * | 6/2009 | Jacques | B60D 1/60 |
| | | | | 280/506 |
| D693,747 | S * | 11/2013 | Lachance | D12/162 |
| 10,434,832 | B2 * | 10/2019 | Pare | B60D 1/60 |
| 10,890,015 | B2 * | 1/2021 | Pavlovic | G07C 9/00896 |
| 11,766,905 | B2 * | 9/2023 | Cato | B60D 1/60 |
| | | | | 280/507 |
| 2006/0208458 | A1 | 9/2006 | Kalous et al. | |
| 2008/0061530 | A1 | 3/2008 | Recknagel et al. | |
| 2009/0102159 | A1 * | 4/2009 | Van Laere | B60D 1/60 |
| | | | | 280/507 |

FOREIGN PATENT DOCUMENTS

CN         204451871 U     7/2015

* cited by examiner

_Primary Examiner_ — Valentin Neacsu
_Assistant Examiner_ — Marlon A Arce

(57) ABSTRACT

A trailer coupler lock includes a lock core frame, a movable
lock head, a limiting piece, and a lock cylinder cover. The
lock core frame has a connector and a first lock tongue, and
a sliding groove is provided in the lock core frame. The
movable lock head includes a sliding block and an engage-
ment portion, the sliding block is slidably installed in the
sliding groove, and the engagement portion cooperates with
the connector to clamp and fix a coupler. The limiting piece
is configured to limit a position of the sliding block in the
sliding groove. The lock cylinder cover is selectively cov-
ering the outside of the lock core frame. The locking piece
is arranged at the periphery of the lock cylinder cover to lock
the lock core frame inside the lock cylinder cover.

15 Claims, 22 Drawing Sheets

A-A

B-B

C-C

D-D

TRAILER COUPLER LOCK

RELATED APPLICATIONS

The present patent document claims the benefit of priority to patent application No. 202521628797.X, filed on Jul. 31, 2025, and entitled "TRAILER COUPLER LOCK," the entire contents of each of which are incorporated herein by reference.

BACKGROUND

1. Technical Field

An embodiment of the present disclosure relates to a lock, and in particular, to a trailer coupler lock.

2. Background Information

With the rapid development of the automotive industry, the use scenarios of trailers have become increasingly diverse. A trailer itself is not powered and needs to be towed by a vehicle. Generally, a towing ball is arranged at a rear end of the vehicle, and a coupler corresponding to the towing ball is arranged at a front end of the trailer.

A coupler lock is a lock used to lock the coupler at the front end of the trailer. Locking the coupler on the unpowered trailer prevents other tractors from coupling and towing, thereby preventing recreational vehicles and other properties from being dragged and occupied by others. The existing coupler lock is limited to single coupler adaptability and offers poor anti-theft safety, which needs to be improved urgently.

BRIEF SUMMARY

In a first aspect, an embodiment of the present disclosure provides a trailer coupler lock which includes a lock core frame, a movable lock head, a limiting piece, and a lock cylinder cover. The lock core frame has a connector and a first lock tongue, and a sliding groove is provided in the lock core frame. The movable lock head includes a sliding block and an engagement portion, the sliding block is slidably installed in the sliding groove, and the engagement portion cooperates with the connector to clamp and fix a coupler. The limiting piece is configured to limit a position of the sliding block in the sliding groove. The lock cylinder cover is selectively covering the outside of the lock core frame. The locking piece is arranged at the periphery of the lock cylinder cover to lock the lock core frame inside the lock cylinder cover.

In a second aspect, an embodiment of the present disclosure provides a trailer coupler lock which includes a lock core frame, a movable lock head, a limiting piece, and a lock cylinder cover. The lock core frame has an engagement portion and a first lock tongue, the engagement portion is engaged with at least one surface of the coupler, and a sliding groove extending in a first direction is formed in the lock core frame. The movable lock head includes a sliding block and an engagement portion, the sliding block is slidably installed in the sliding groove, and the engagement portion cooperates with the connector to clamp and fix a coupler. The limiting piece is configured to limit a position of the sliding block in the sliding groove. The lock cylinder cover is selectively covering the outside of the lock core frame. The locking piece is arranged at the periphery of the lock cylinder cover to lock the lock core frame inside the lock cylinder cover.

BRIEF DESCRIPTION OF THE DRAWINGS

The accompanying drawings of the specification, which constitute a part of the present disclosure, are used to provide a further understanding of the present disclosure. The illustrative embodiments of the present disclosure and their descriptions are used to explain the present disclosure, and do not constitute undue limitations on the present disclosure.

Figure 1:
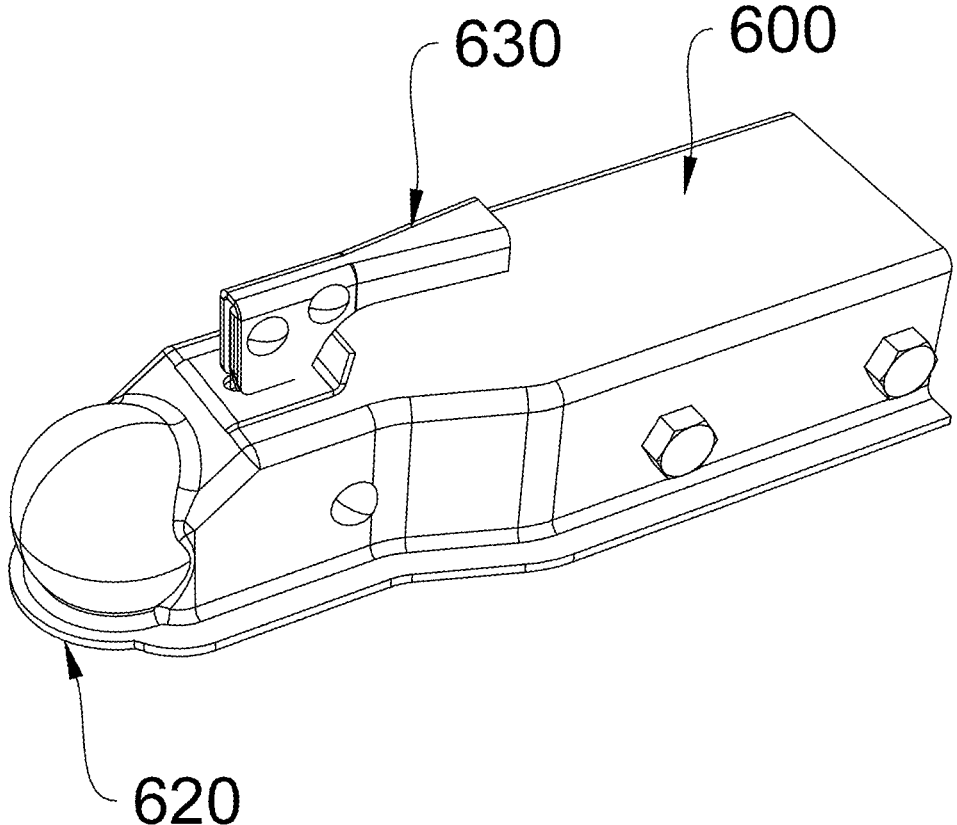
FIG. 1 is a perspective view of a coupler.

Description of reference numerals: 100. Lock core frame; 110. First lock tongue; 120. Sliding groove; 121. Second end; 130. Limiting plate; 140. Second panel; 200. Movable lock head; 210. Sliding block; 300. Limiting piece; 310. Positioning hole; 320. Latch hole; 321. First latch hole; 322. Second latch hole; 330. Latch; 331. Latch post; 332. Latch handle; 340. Accommodating groove; 341. First accommodating groove; 342. Second accommodating groove; 350. First end face; 360. Limiting groove; 370. Limiting hole; 380. Limiting jack screw; 381. Limiting end; 400. Lock cylinder cover; 410. Avoidance hole; 420. First inner wall; 430. Second inner wall; 440. Leveling groove; 450. Second lock tongue; 460. Installation groove; 470. Wrench groove; 500. Locking piece; 510. Lock groove; 600. Coupler; 610. Spherical chamber; 620. Flange; 630. Locking wrench; 700. Engagement portion; 710. Retaining groove; 800. Connector; x. First direction; y. Second direction.

DETAILED DESCRIPTION OF THE DRAWINGS
AND THE PRESENTLY

Preferred Embodiments

The present disclosure will be described in detail below with reference to the accompanying drawings and in conjunction with the embodiments. Various examples are provided by way of explanation of the present disclosure and are not intended to limit the present disclosure. In fact, it will be clear to those skilled in the art that modifications and variations can be made to the present disclosure without departing from the scope or spirit of the present disclosure. For example, features shown or described as part of one embodiment may be used in another embodiment to yield yet another embodiment. Therefore, it is desired that the present disclosure includes such modifications and variations within the scope of the appended claims and their equivalents.

In the description of the present disclosure, terms such as "longitudinal," "transverse," "upper," "lower," "front," "rear," "left," "right," "vertical," "horizontal," "top" and "bottom" indicate orientational or positional relationships shown based on the accompanying drawings, and are only intended to facilitate the description of the present disclosure rather than to require that the present disclosure must be constructed and operated in a specific direction, and therefore, shall not be understood as a limitation to the present disclosure. Terms such as "connected," "joined," "arranged" and "engaged" used in the present disclosure shall be understood in a broad sense. For example, they may refer to fixed connection or detachable connection, may refer to direct connection or indirect connection through an intermediate component, may refer to wired electrical connection or wireless electrical connection, or may refer to wireless communication signal connection. For those of ordinary skill in the art, the specific meanings of the above terms may be understood according to specific conditions.

One or more examples of the present disclosure are shown in the accompanying drawings. Numerical and alphabetical symbols are used in the detailed description to refer to features in the accompanying drawings. Identical or similar symbols in the accompanying drawings and description have been used to refer to identical or similar parts of the present disclosure. As used herein, the terms such as "first," "second," and "third" are used interchangeably to distinguish one component from another and are not intended to denote the position or importance of individual components.

According to the present disclosure, an embodiment provides a trailer coupler lock, including: a lock core frame 100, a movable lock head 200, a limiting piece 300, a lock cylinder cover 400, and a locking piece 500.

Figure 2:
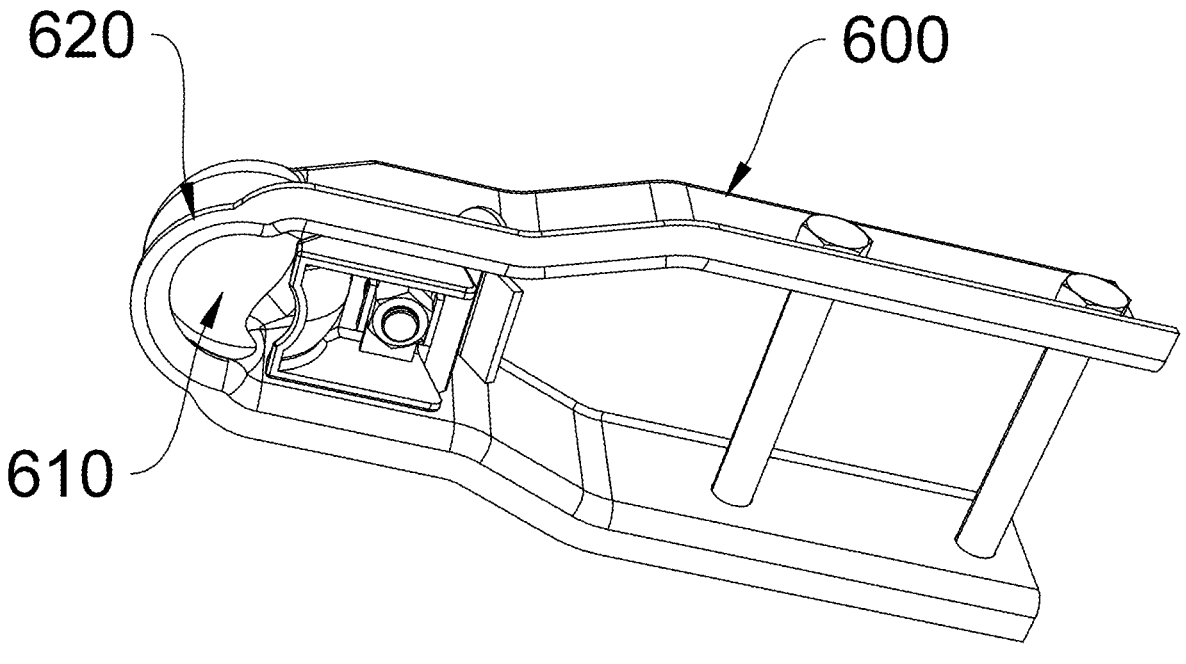
FIG. 2 is a perspective view of a coupler from another perspective.
Figure 3:
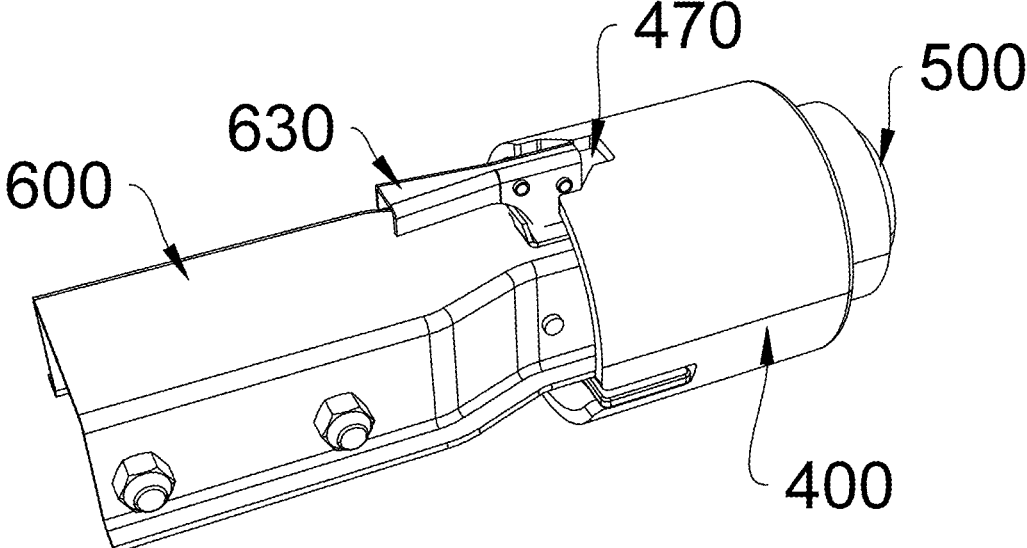
FIG. 3 is a perspective view of a coupler connected with a trailer coupler lock according to an embodiment of the present disclosure.
Figure 4:
FIG. 4 is a perspective view of a coupler connected with a trailer coupler lock according to an embodiment of the present disclosure from another perspective.
Figure 4:
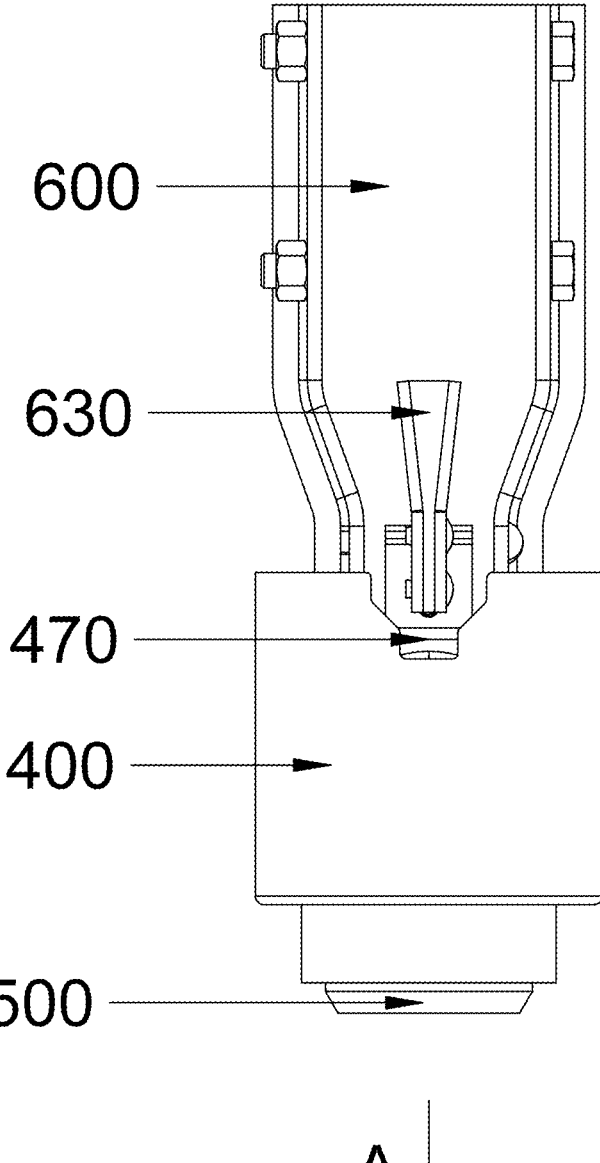
Figure 5:
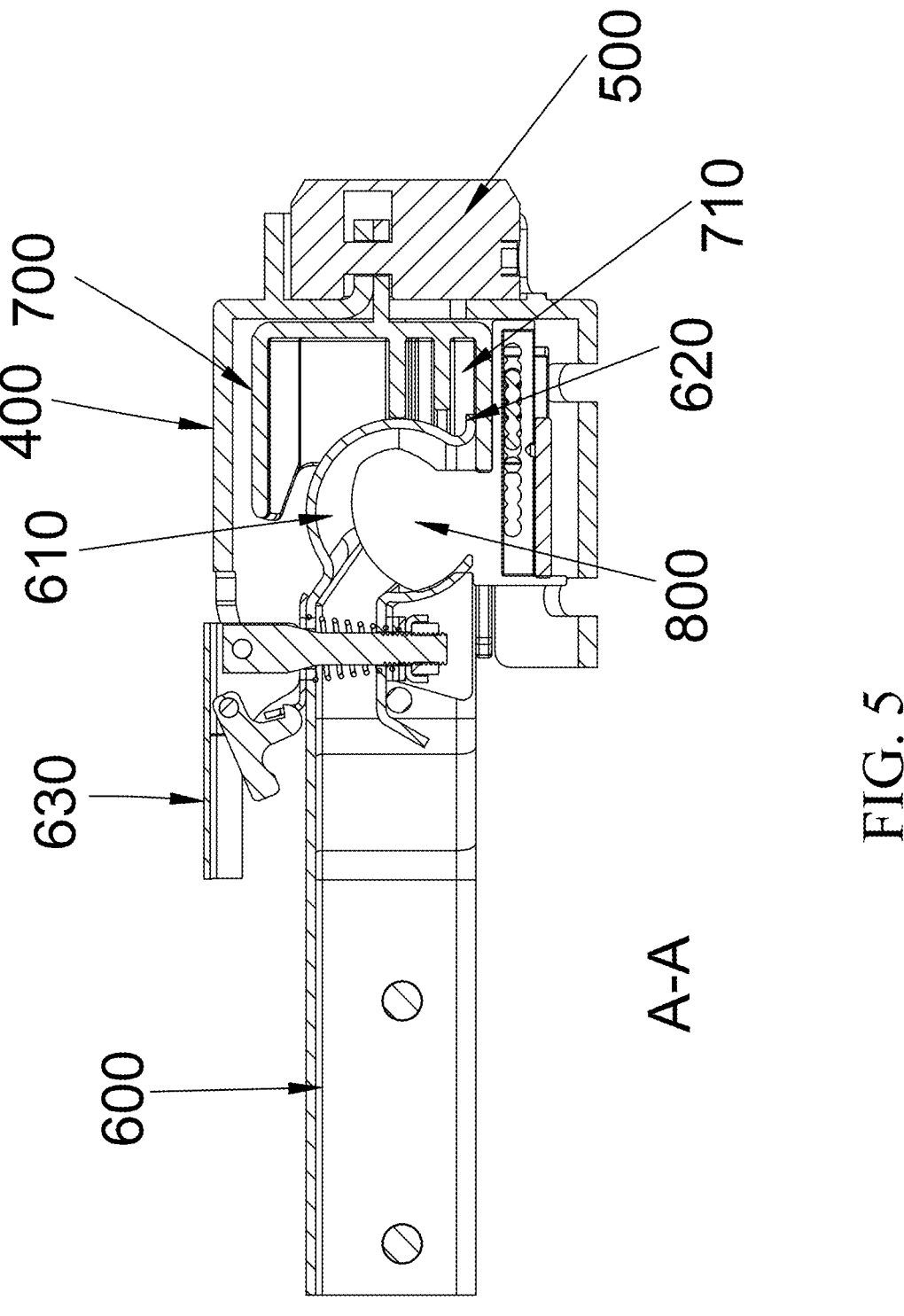
FIG. 5 is a sectional view taken along an A-A direction in FIG. 5.
Figure 6:
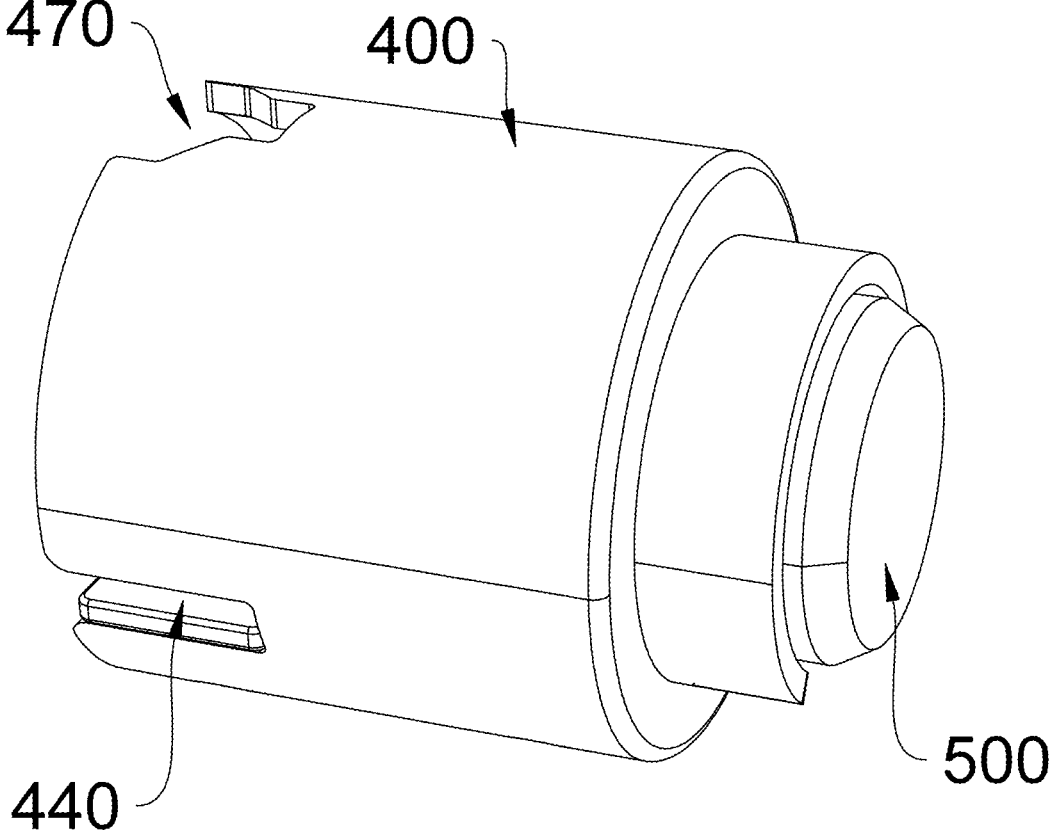
FIG. 6 is a perspective view of a trailer coupler lock according to an embodiment of the present disclosure.
Figure 7:
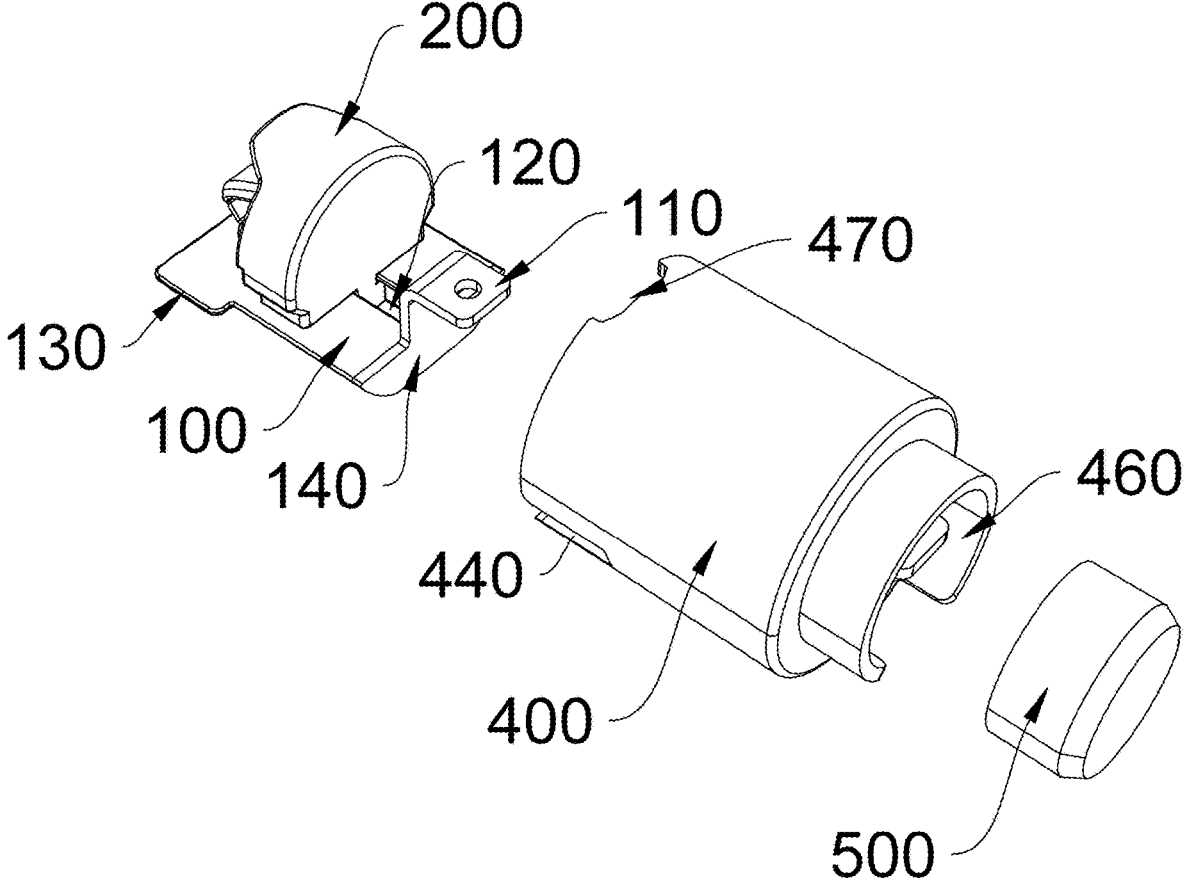
FIG. 7 is an exploded perspective view of a trailer coupler lock according to an embodiment of the present disclosure.

As shown in FIGS. 1-5, the trailer coupler lock is used to limit access to a trailer coupler 600 or other structure designed to engage a spherical coupling device. The coupler 600 generally includes a spherical chamber 610 that accommodates the spherical coupling device. The spherical chamber 610 is generally positioned near one end of the coupler 600, allowing a housing to be located between the spherical chamber 610 and an outer surface of the coupler 600. In this embodiment, the coupler 600 may further include a flange 620 and a locking wrench 630. The flange 620 extends along the outer periphery of the coupler 600, and the locking wrench 630 is arranged on the outside of the spherical chamber 610 to lock the spherical coupling device in the spherical chamber 610. Obviously, the coupler 600 may be manufactured in various sizes and designs, and the coupler 600 shown in FIGS. 1-2 is only exemplary.

As shown in FIGS. 6-9, 15 and 16, the lock core frame 100 and the movable lock head 200 are parts of the trailer coupler lock that are engaged with the coupler 600, and the lock core frame 100 cooperates with the movable lock head 200 to achieve a satisfactory connection with the coupler 600. The lock core frame 100 and the movable lock head 200 are movably connected, allowing relative positions of the lock core frame 100 and the movable lock head 200 to be adjusted for connection of couplers 600 of different sizes and types, thereby enhancing the adaptability of the trailer coupler lock.

In one embodiment, the limiting piece 300 is arranged between the lock core frame 100 and the movable lock head 200. When the lock core frame 100 and the movable lock head 200 are connected with the coupler 600, the relative positions of the lock core frame 100 and the movable lock head 200 are first adjusted to allow the engagement portion of the coupler 600 to be easily clamped between the lock core frame 100 and the movable lock head 200. Then, the relative positions of the lock core frame 100 and the movable lock head 200 are further adjusted, so that the distance between the lock core frame 100 and the movable lock head 200 is gradually reduced until the coupler 600 is clamped. Finally, the limiting piece 300 is connected with the lock core frame 100 and the movable lock head 200, so that the lock core frame 100 and the movable lock head 200 are limited at the adjusted relative positions, thereby ensuring the stability when the coupler 600 is engaged with the lock core frame 100 and the movable lock head 200.

After the coupler 600 is connected between the lock core frame 100 and the movable lock head 200, and the relative positions of the lock core frame 100 and the movable lock head 200 are limited by the limiting piece 300, the lock cylinder cover 400 may cover the outer side of the lock core frame 100, and the first lock tongue 110 may pass through an avoidance hole 410 in the lock cylinder cover 400. When the locking piece is arranged at the periphery of the lock cylinder cover, the locking piece 500 may be connected with a first locking tongue 110 extending from the avoidance hole 410 to lock the lock core frame 100 inside the lock cylinder cover 400, so that the lock cylinder cover 400 can protect the engagement portions of the internal lock core frame 100, the movable lock head 200, the limiting piece 300 and the coupler 600, thereby preventing an external force from directly damaging the connection structure and improving the anti-theft safety. Meanwhile, the limiting piece 300 is accommodated inside the lock cylinder cover 400, which can prevent relative movement between the lock core frame 100 and the movable lock head 200 due to external contact and operation of the limiting piece 300, thereby ensuring the connection stability of the coupler 600.

Figure 8:
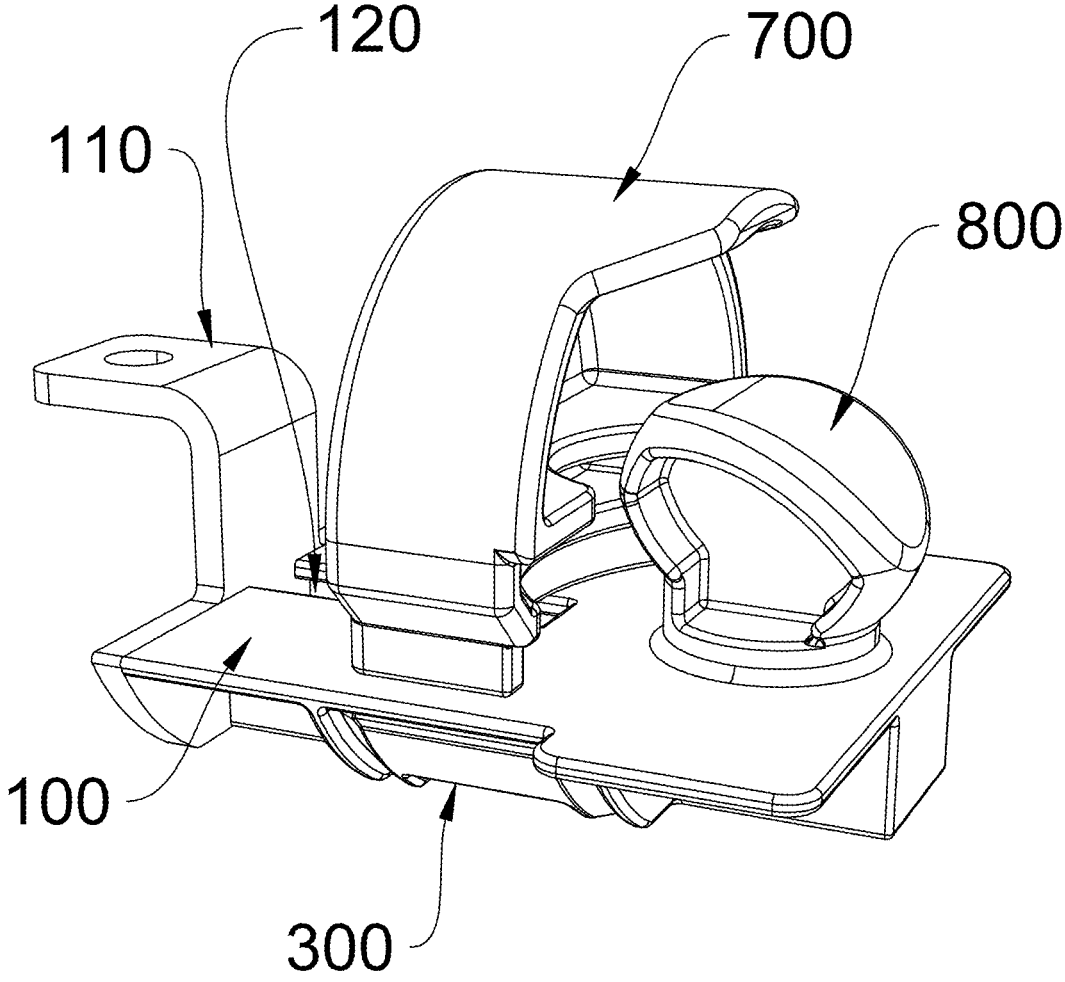
FIG. 8 is a perspective view of a lock core frame and a movable lock head according to an embodiment of the present disclosure.
Figure 9:
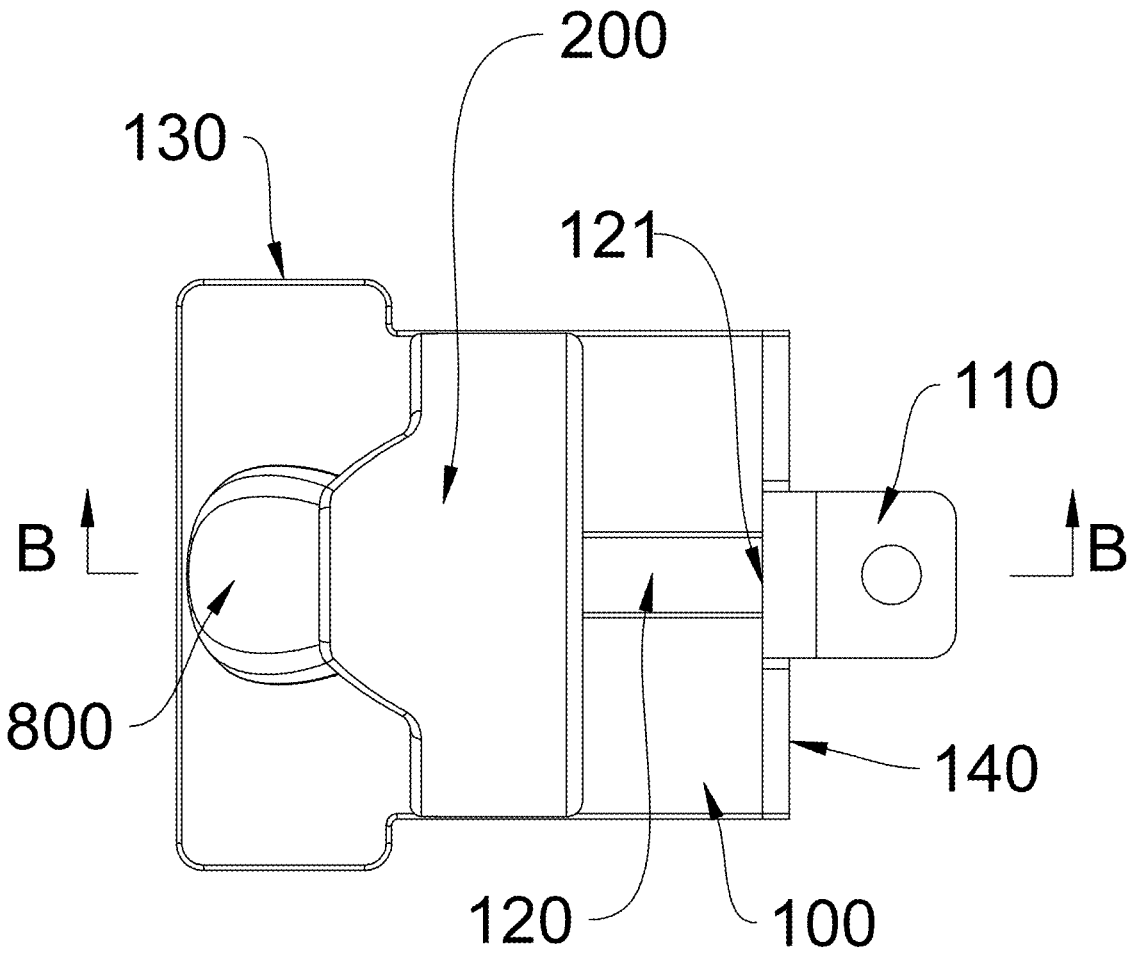
FIG. 9 is a schematic structural of a lock core frame and a movable lock head according to an embodiment of the present disclosure.
Figure 10:
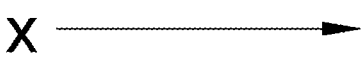
FIG. 10 is a sectional view taken along a B-B direction in FIG. 8.
Figure 10:
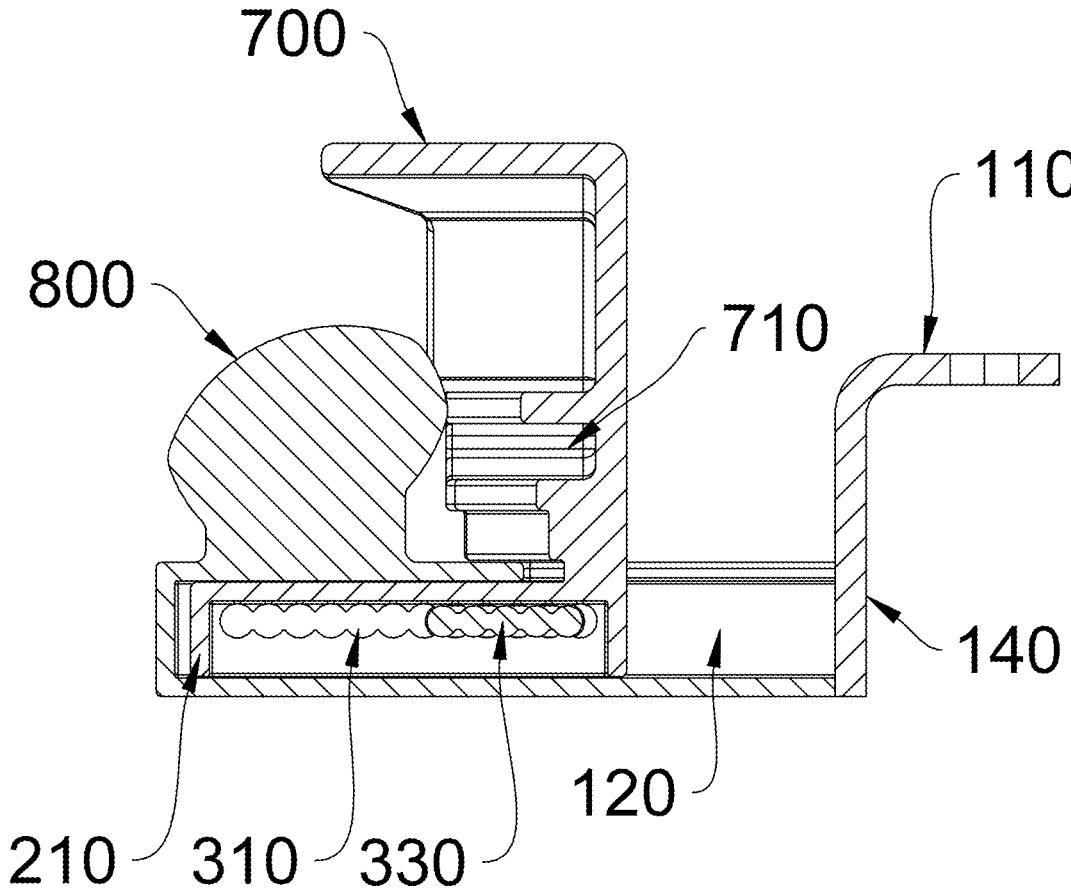

In one embodiment, as shown in FIGS. 8-10, the lock core frame 100 includes a connector 800 and a sliding groove 120. The movable lock head 200 includes a sliding block 210 and an engagement portion 700. The sliding groove 120 extends in a first direction x, and the sliding block 210 is slidably installed in the sliding groove 120 to achieve a movable connection between the lock core frame 100 and the movable lock head 200. The connector 800 may be engaged with the spherical chamber 610 of the coupler 600, and the engagement portion 700 may be engaged with at least one surface of the coupler 600. The engagement portion 700 is connected to the sliding block 210, and the sliding block 210 slides along the sliding groove 120 to drive the engagement portion 700 to move, so that the relative positions of the engagement portion 700 and the connector 800 may be adjusted to adapt to couplers 600 of different sizes and types.

When the coupler 600 is connected, the spherical chamber 610 of the coupler 600 is first engaged with the connector 800 of the lock core frame 100. Then, the sliding block 210 slides along the sliding groove 120 to drive the engagement portion 700 to move, so that an outer surface of the coupler 600 is engaged with the engagement portion 700 of the movable lock head 200. In this case, the engagement portion 700 and the connector 800 work together to clamp and fix the coupler 600 between the lock core frame 100 and the movable lock head 200, thereby achieving a satisfactory connection effect.

The limiting piece 300 is arranged between the sliding groove 120 and the sliding block 210 to limit the relative sliding between the sliding block 210 and the sliding groove 120 after the coupler 600 is connected. This ensures that the relative positions of the engagement portion 700 and the connector 800 remain stable, so as to stably engage and clamp the coupler 600 and improve the connection stability of the coupler 600.

Figure 11:
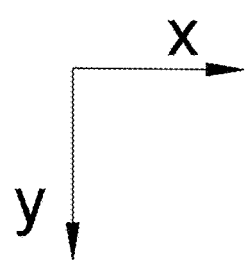
FIG. 11 is a perspective view of a lock core frame and a movable lock head according to an embodiment of the present disclosure.
Figure 11:
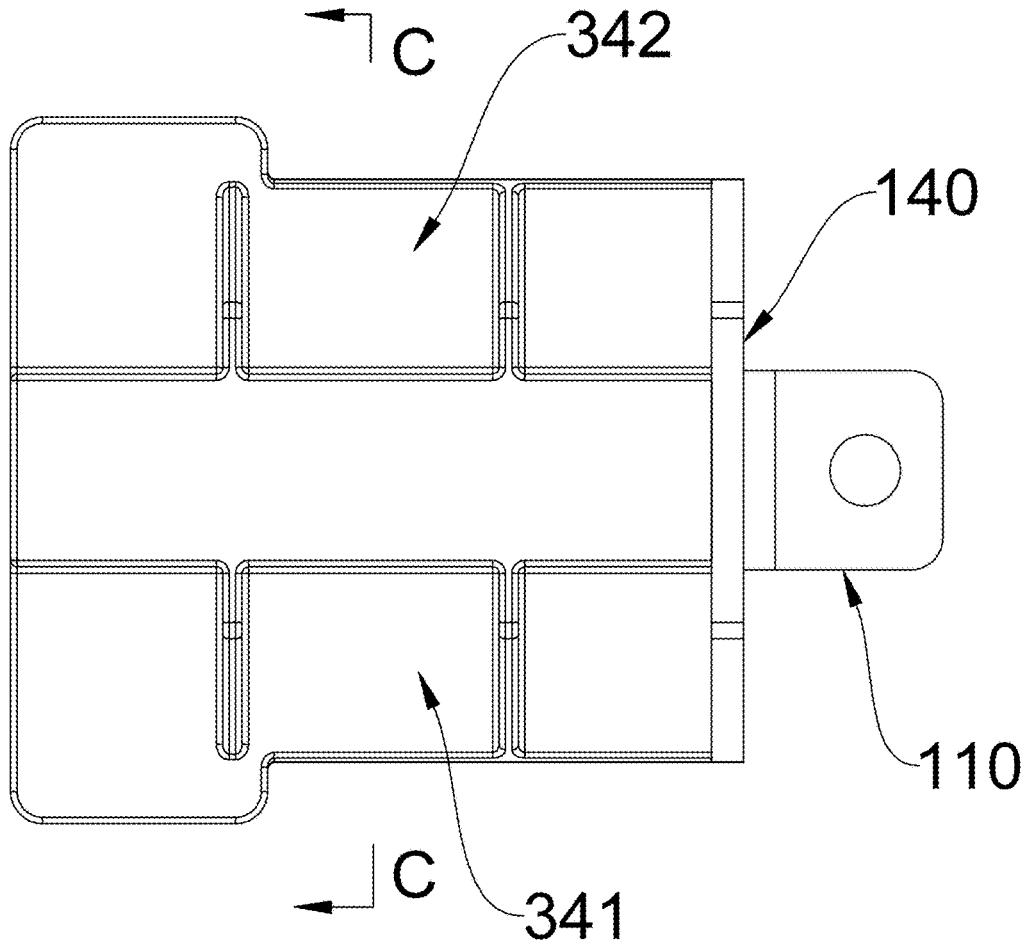

In one embodiment, as shown in FIGS. 10-11, a plurality of positioning holes 310 are formed in the sliding block 210 in the first direction x, and a latch hole 320 is formed in an inner wall of the sliding groove 120. The limiting piece 300 includes a latch 330. The latch 330 may pass through the latch hole 320 and may be selectively inserted into any one of the plurality of positioning holes 310 to limit the relative sliding between the sliding block 210 and the sliding groove 120, so that the relative position between the movable lock head 200 and the lock core frame 100 remains stable and the connection stability of the coupler 600 is ensured.

Figure 13:
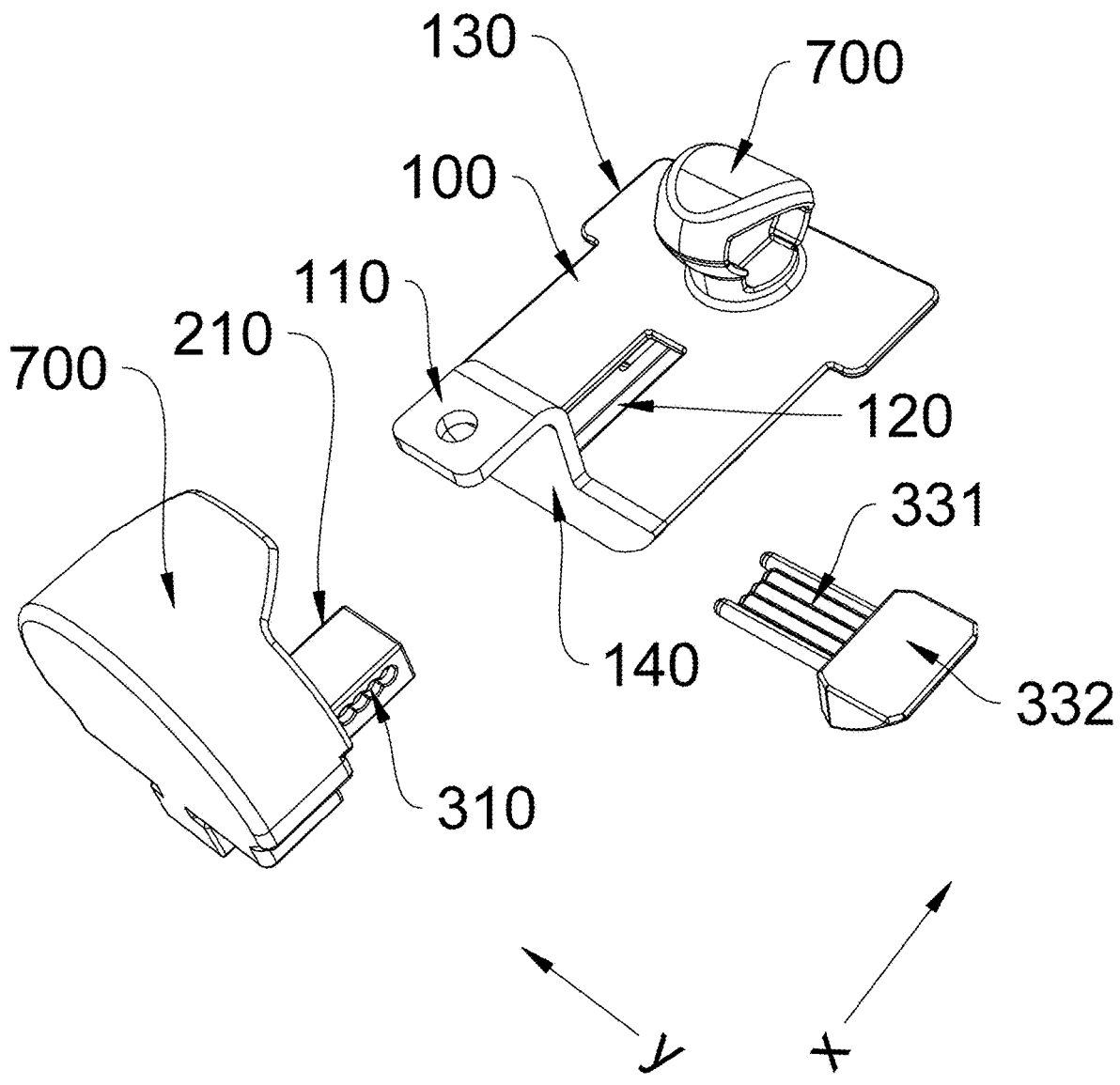
FIG. 13 is an exploded perspective view of a lock core frame and a movable lock head according to an embodiment of the present disclosure.
Figure 14:
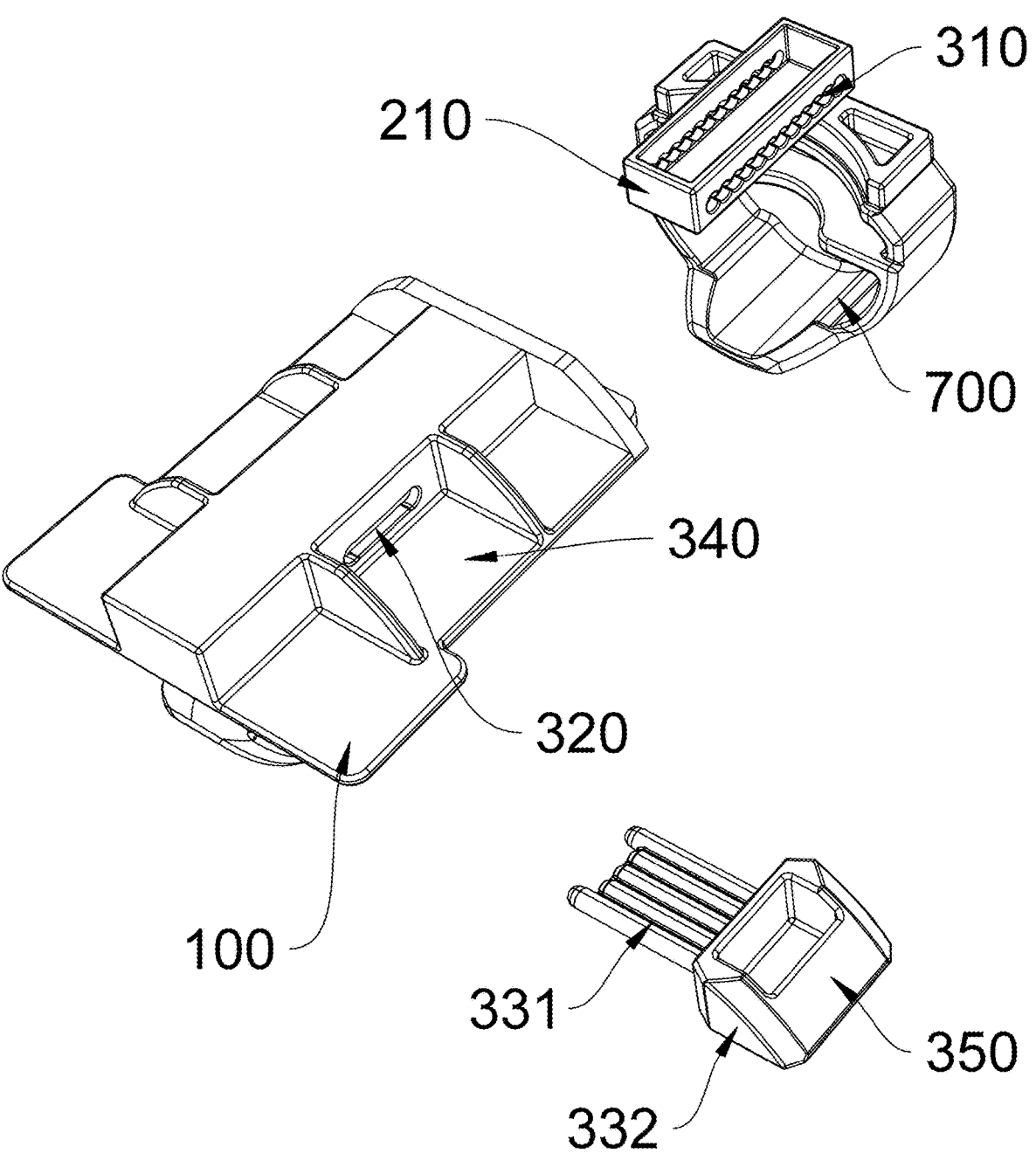
FIG. 14 is an exploded perspective view of a lock core frame and a movable lock head according to an embodiment of the present disclosure from another perspective.

In one embodiment, as shown in FIGS. 13-14, a plurality of positioning holes 310 all run through the sliding block 210 in a second direction y. The latch hole 320 includes a first latch hole 321 and a second latch hole 322. The latch 330 extends through the first latch hole 321, the plurality of positioning holes 310 and the second latch hole 322 in sequence, or extends through the second latch hole 322, the plurality of positioning holes 310 and the first latch hole 321 in sequence to limit the relative sliding between the sliding block 210 and the sliding groove 120. Since the latch 330 completely extends through the plurality of positioning holes 310, the action area between the latch 330 and the plurality of positioning holes 310 is larger. Meanwhile, the first latch hole 321 and the second latch hole 322 are respectively located in both sides of the plurality of positioning holes 310 and can jointly act on the latch 330. As a result, the latch 330 may offer a stronger limit bearing capacity, avoiding the loose connection of the coupler 600 caused by violent pulling, and improving the anti-theft safety of the trailer coupler lock.

In one embodiment, the second direction y and the first direction x are perpendicular to each other in a horizontal plane. When inserted into the plurality of positioning holes 310, the latch 330 may be perpendicular to a sliding direction of the sliding block 210, and pushing or pulling the movable lock head 200 or the lock core frame 100 in the sliding direction does not affect the insertion state of the latch 330, so that the latch 330 has satisfactory stability and achieves a better limiting effect.

In one embodiment, the latch 330 includes a latch post 331 and a latch handle 332. The latch handle 332 is connected to one end of the latch post 331, and the latch handle 332 is available for a user to grasp and operate the latch 330. The latch 330 can be operated without tools, enabling the insertion for limiting and withdrawal for release of the latch post 331, making it simpler and more convenient to use. An accommodating groove 340 is formed in the lock core frame 100, and the latch hole 320 is formed in the accommodating groove 340. When the latch post 331 is inserted into the plurality of positioning holes 310 from the latch hole 320, the latch handle 332 connected to one end of the latch post 331 is accommodated in the accommodating groove 340. The accommodating groove 340 can not only protect the latch handle 332, but also play a role in limiting and bearing the latch handle 332, thereby improving the stability of the latch 330.

Figure 12:
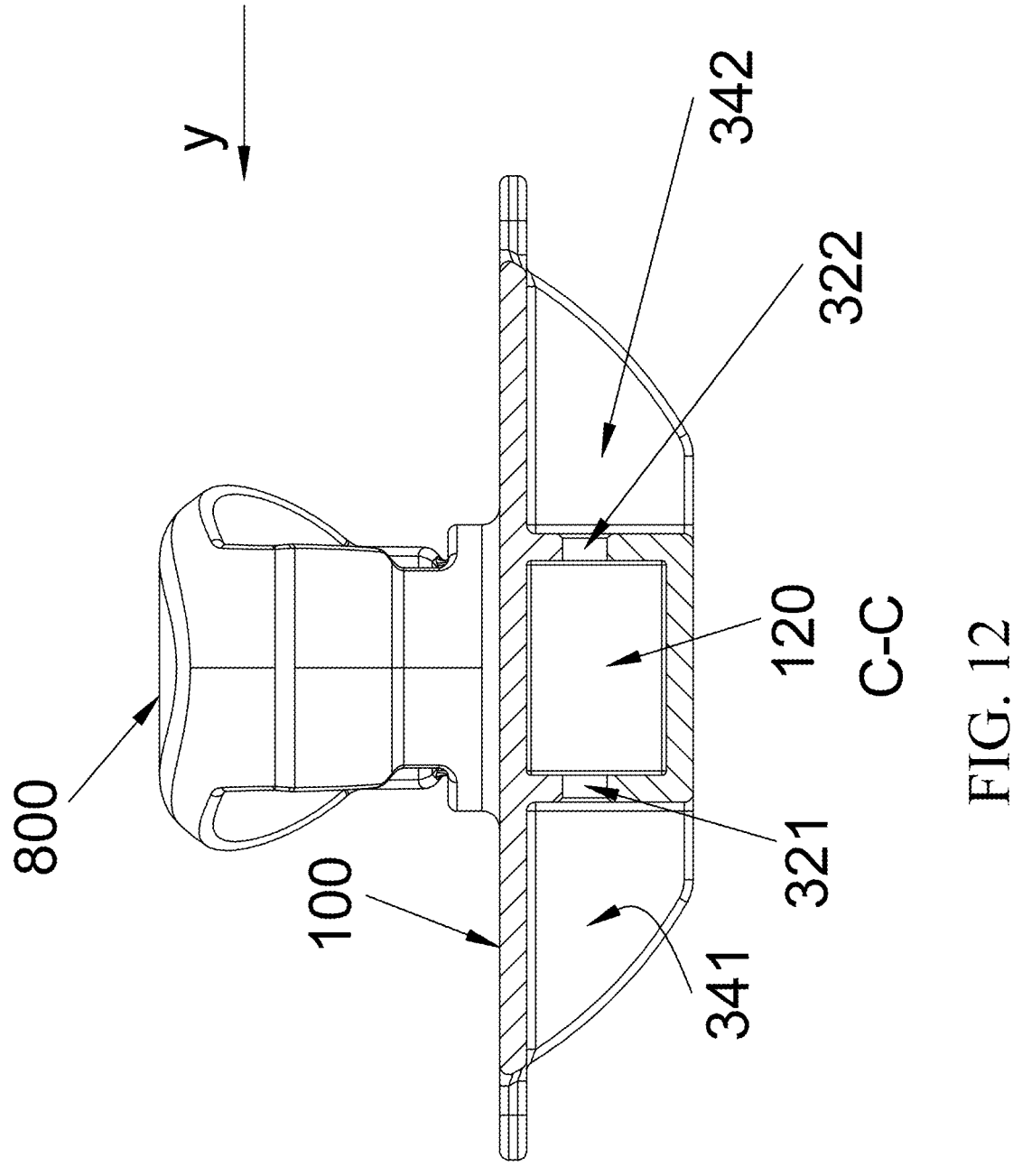
FIG. 12 is a sectional view taken along a line C-C in FIG. 10.

In one embodiment, as shown in FIGS. 11 and 12, two groups of accommodating grooves 340 are provided, including a first accommodating groove 341 located outside the first latch hole 321, and a second accommodating groove 342 located outside the second latch hole 322. The latch 330 may be inserted from the first latch hole 321 so that the latch handle 332 is accommodated in the first accommodating groove 341, or inserted from the second latch hole 322 so that the latch handle 332 is accommodated in the second accommodating groove 342. When in use, the latch handle 332 can be accommodated in the accommodating groove 340 without distinguishing the insertion direction of the latch 330, so as to achieve a satisfactory accommodating effect and easy operation.

Figure 15:
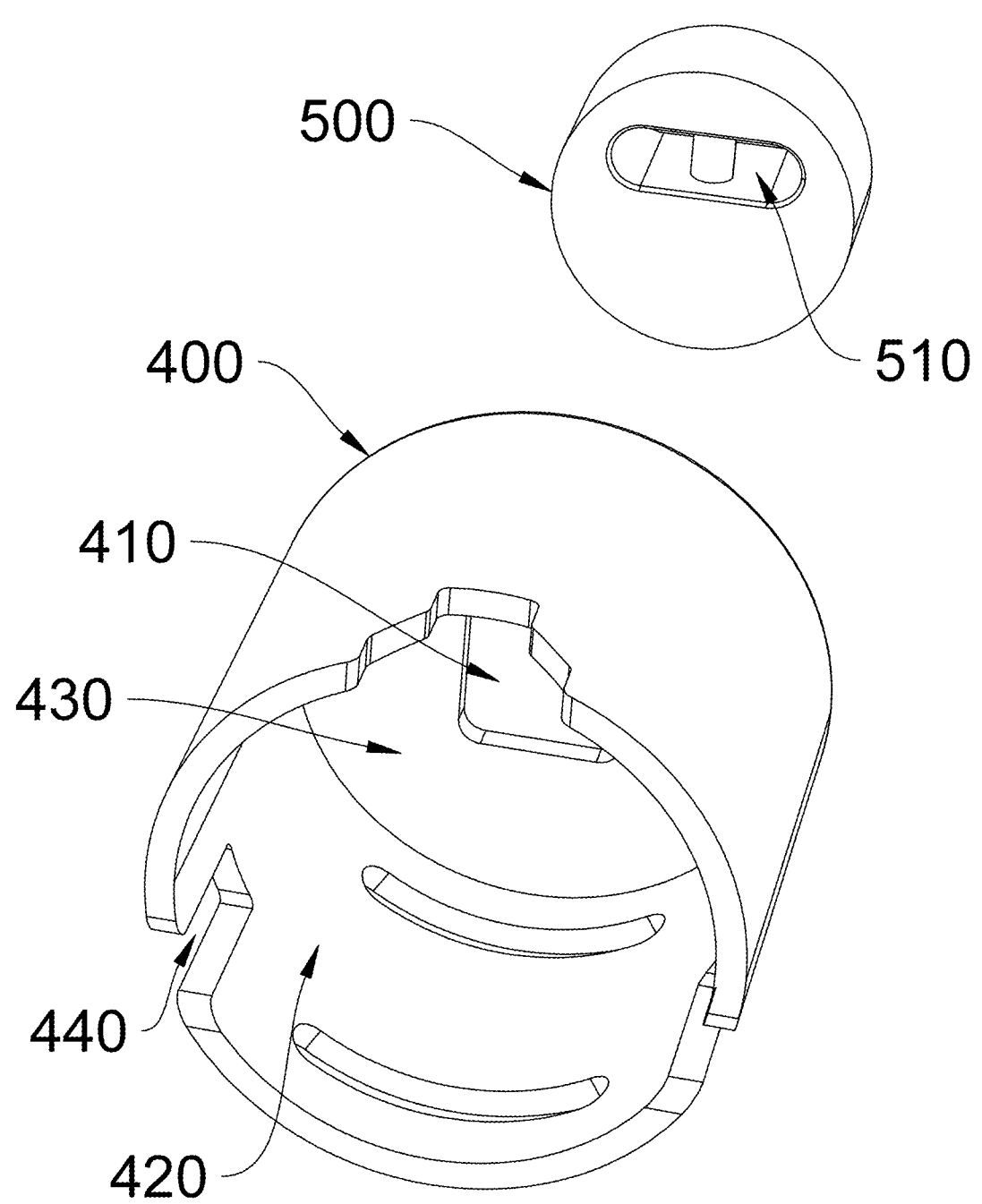
FIG. 15 is a perspective view of a lock cylinder cover and a locking piece according to an embodiment of the present disclosure.
Figure 16:
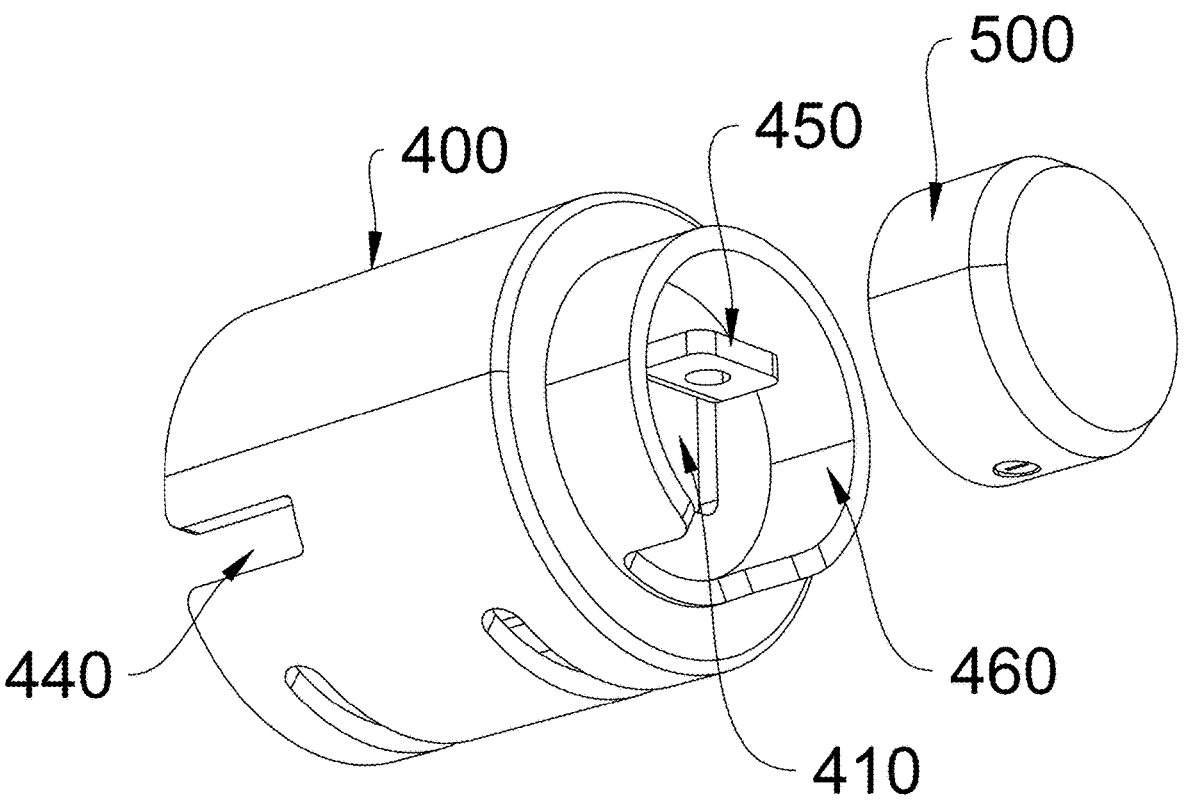
FIG. 16 is a perspective view of a lock cylinder cover and a locking piece according to an embodiment of the present disclosure from another perspective.
Figure 17:
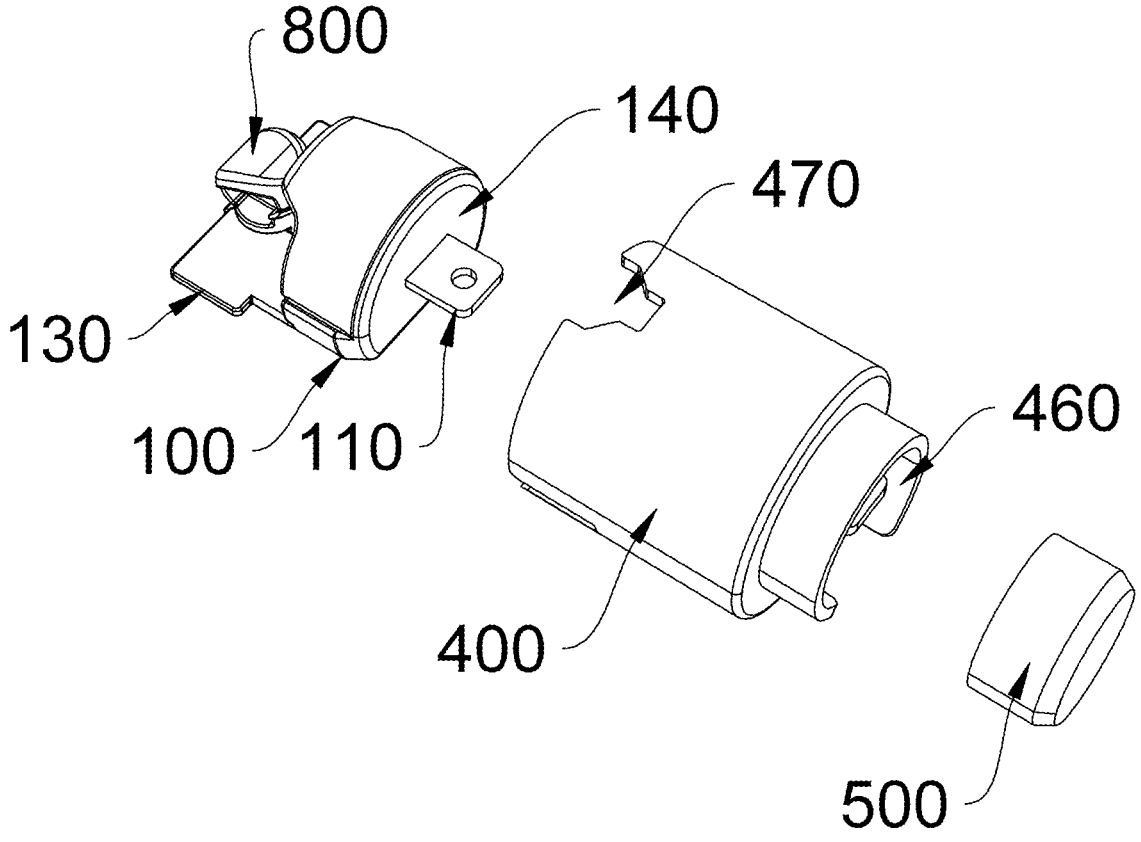
FIG. 17 is an exploded perspective view of a trailer coupler lock according to an embodiment of the present disclosure.
Figure 18:
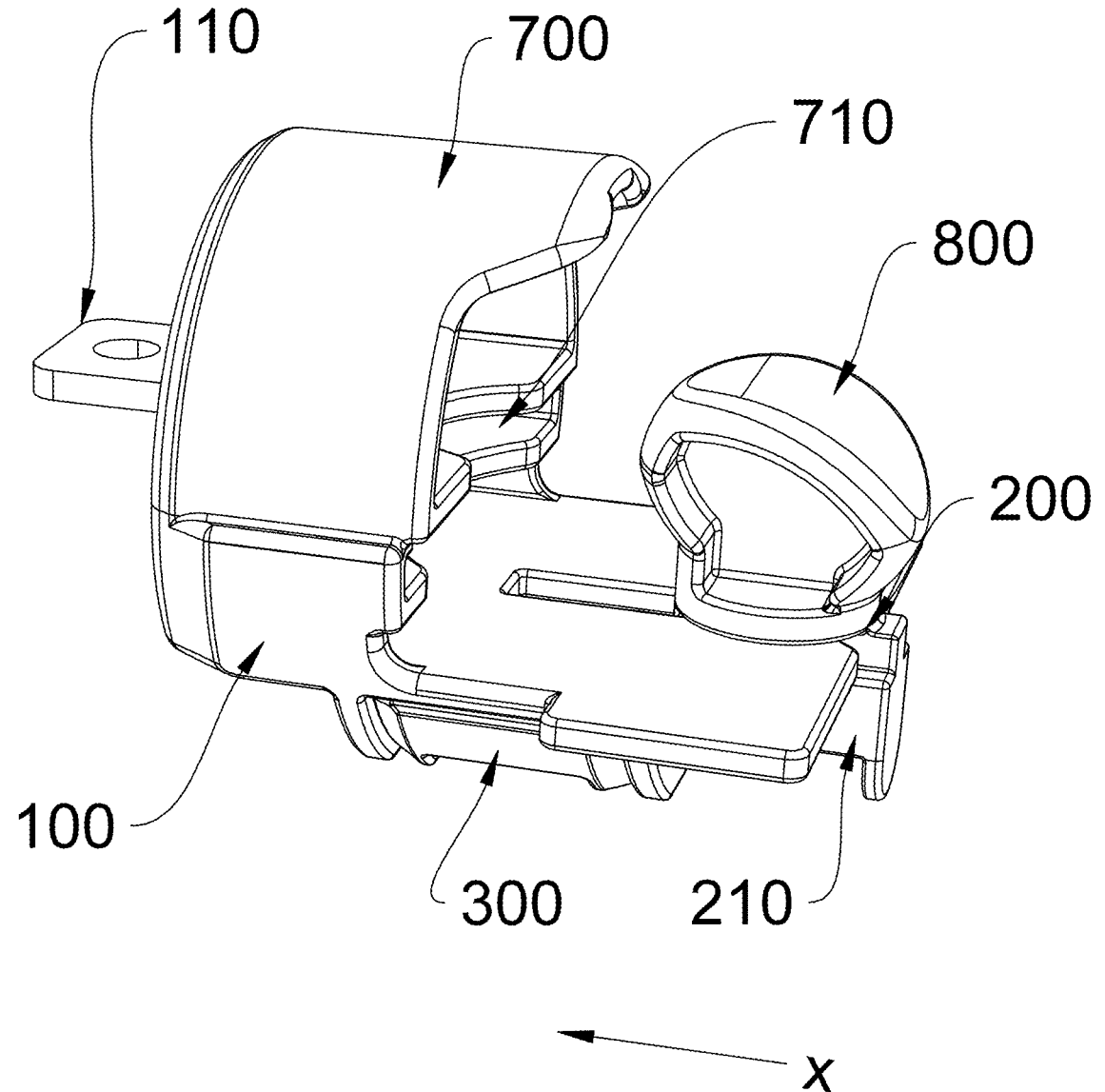
FIG. 18 is a perspective view of a lock core frame and a movable lock head according to an embodiment of the present disclosure.
Figure 19:
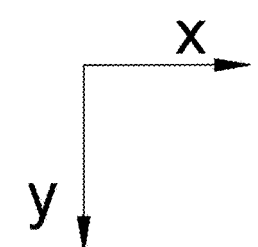
FIG. 19 is a perspective view of a lock core frame and a movable lock head according to an embodiment of the present disclosure.
Figure 19:
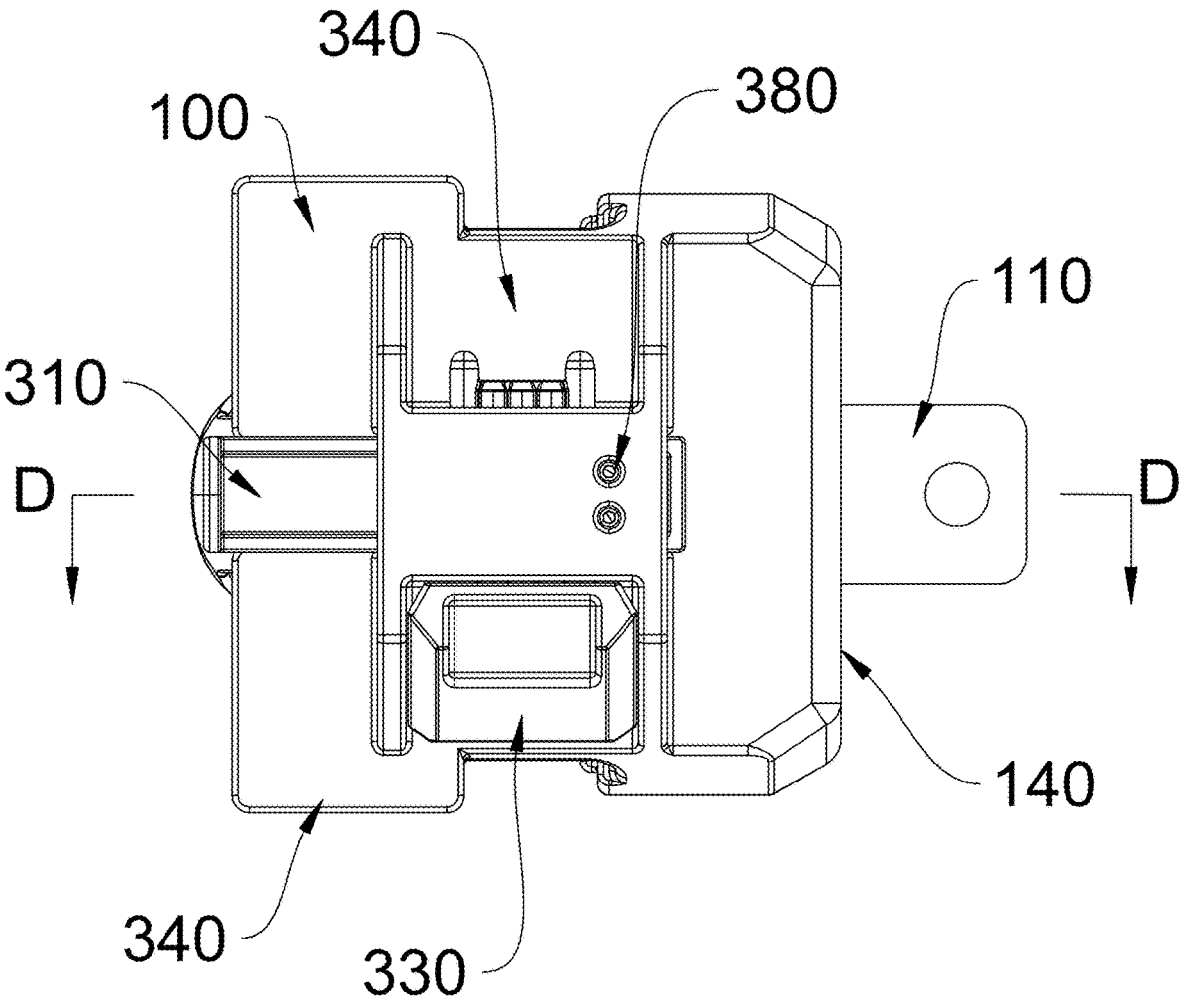
Figure 20:
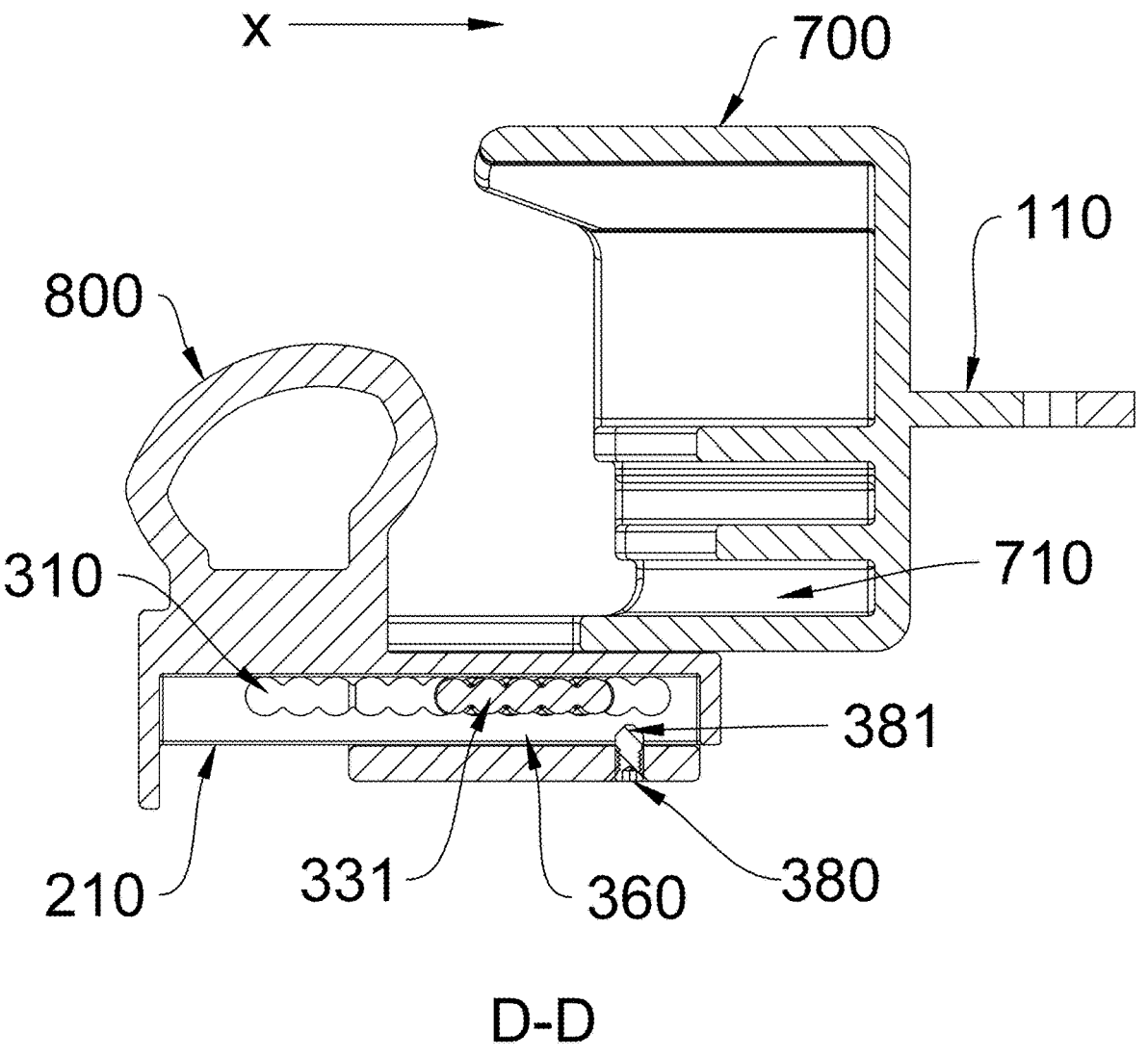
FIG. 20 is a sectional view taken along a line D-D in FIG. 18.
Figure 21:
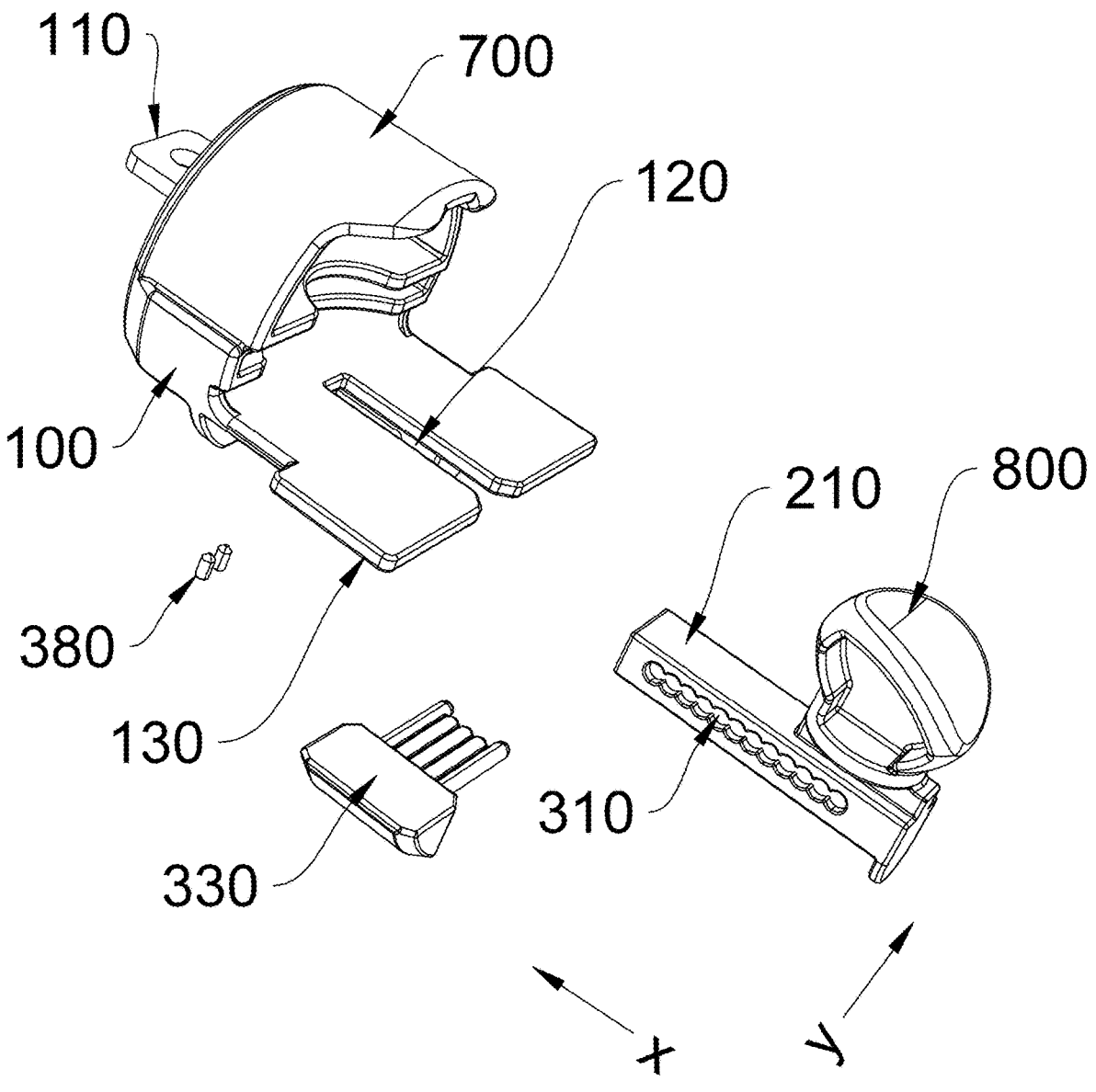
FIG. 21 is an exploded perspective view of a lock core frame and a movable lock head according to an embodiment of the present disclosure.
Figure 22:
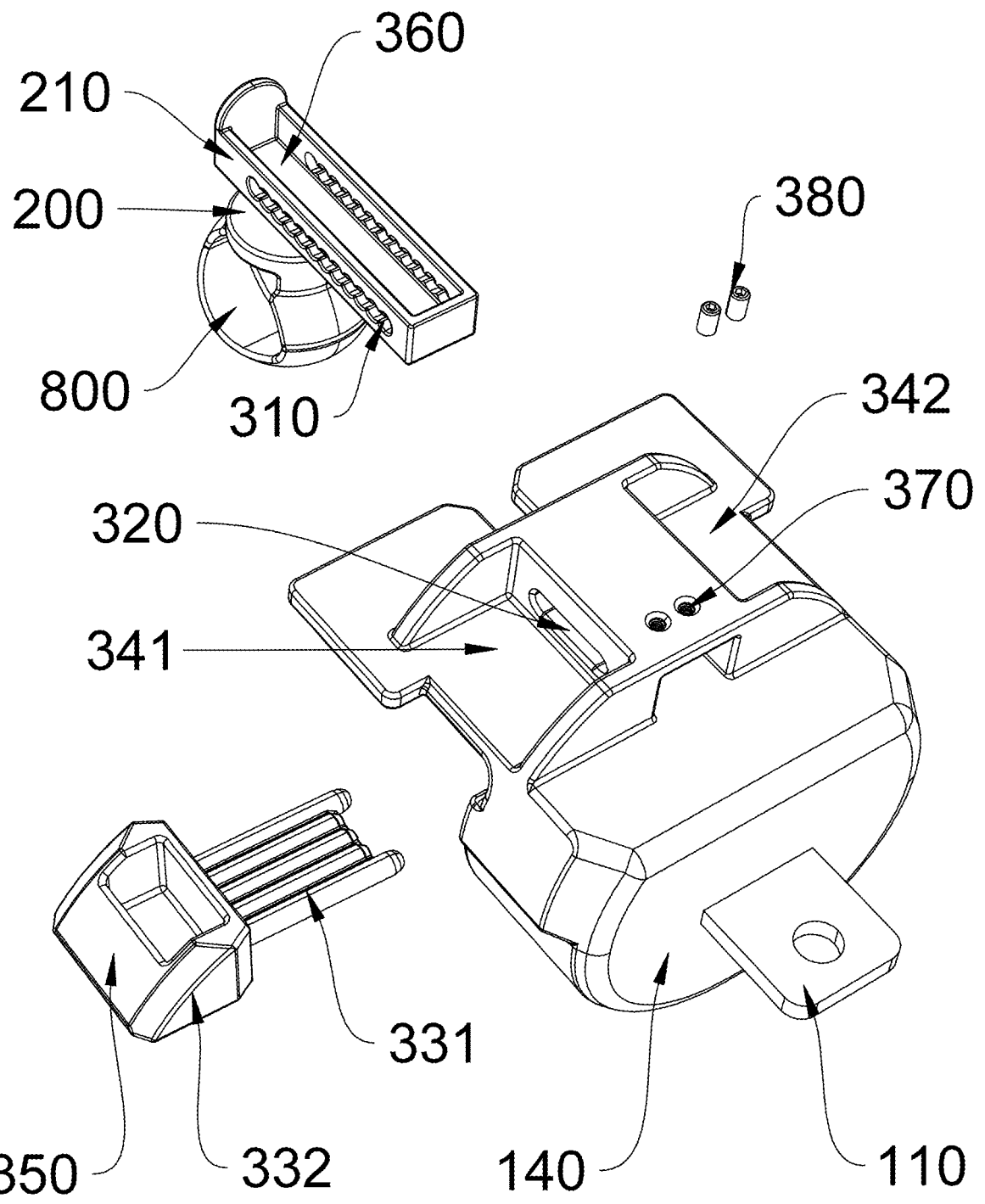
FIG. 22 is an exploded perspective view of a lock core frame and a movable lock head according to an embodiment of the present disclosure from another perspective.

In one embodiment, as shown in FIGS. 14 and 15, the latch handle 332 is provided with a first end face 350. When the latch post 331 is inserted into the plurality of positioning holes 310 and the lock cylinder cover 400 is arranged on the outside of the lock core frame 100, the first end face 350 of the latch handle 332 abuts against the first inner wall 420 of the lock cylinder cover 400 to prevent the latch post 331 from falling out of the plurality of positioning holes 310, ensuring that the latch 330 maintains a stable limiting effect and thus guarantees the connection stability of the coupler 600.

In one embodiment, a plurality of latch posts 331 are provided, and the number of the plurality of positioning holes 310 is greater than that of the latch posts 331. The plurality of latch posts 331 are arranged in the first direction x. When inserted for limiting, the plurality of latch posts 331 may be inserted into the plurality of positioning holes 310 simultaneously. The plurality of latch posts 331 simultaneously limit the relative sliding between the sliding block 210 and the sliding groove 120, resulting in better limiting stability and resistance to damage.

In one embodiment, a retaining groove 710 is formed in the engagement portion 700 and may be engaged with the flange 620 of the coupler 600 to further improve the stability of engagement between the engagement portion 700 and the coupler 600, resulting in a more secure connection between the trailer coupler lock and the coupler 600 more stable.

In one embodiment, a plurality of groups of retaining grooves 710 are provided. Different retaining grooves 710 may be engaged with the flanges 620 of couplers 600 of different sizes and types, enabling better engagement between the engagement portion 700 and the coupler 600. The plurality of groups of retaining grooves 710 improve the adaptability of the engagement portion 700 to different couplers 600 and optimize the connection stability of the couplers 600.

In one embodiment, a limiting plate 130 is arranged on the lock core frame 100, and a leveling groove 440 is formed in the lock cylinder cover 400. When the lock cylinder cover 400 is arranged on the outside of the lock core frame 100, the limiting plate 130 cooperates with the leveling groove 440 to limit the lock cylinder cover 400 to cover in a circumferential direction of the lock core frame 100, so that the first locking tongue 110 may properly extend out of the avoidance hole 410, achieving a satisfactory installation effect. Meanwhile, the limit plate 130 is accommodated in the leveling groove 440, which can also prevent the relative rotation between the lock core frame 100 and the lock cylinder cover 400, improving the overall stability of the trailer coupler lock. In one embodiment, as shown in FIGS. 7-9 and 15, the lock core frame 100 is provided with a second panel 140, and a second inner wall 430 is arranged in the lock cylinder cover 400. When the lock cylinder cover 400 is arranged on the outside of the lock core frame 100, the second panel 140 abuts against the second inner wall 430, limiting the relative positions of the lock core frame 100 and the lock cylinder cover 400 and improving the stability and integrity of the trailer coupler lock.

In one embodiment, as shown in FIG. 9, the second panel 140 is arranged at a second end 121 of the sliding groove 120. The second panel 140 blocks and seals the second end 121 of the sliding groove 120, preventing the sliding block 210 from falling out of the sliding groove 120 and improve the integrity and stability of the trailer coupler lock. Definitely, in other embodiments, the second end 121 of the sliding groove 120 may also be designed as an opening. The sliding block 210 may slide out from the first end of the sliding groove 120, allowing the movable lock head 200 to be separated from the lock core frame 100, providing higher flexibility in connection between the movable lock head 200 and the coupler 600, and making installation and use more convenient.

In one embodiment, as shown in FIGS. 6, 7, 15 and 16, a second locking tongue 450 is arranged on the lock cylinder cover 400. The second lock tongue 450 is located outside the avoidance hole 410. The locking piece 500 may lock the first lock tongue 110 and the second lock tongue 450 together, which can not only lock the lock core frame 100 inside the lock cylinder cover 400, but also fix the relative positions of the lock core frame 100 and the lock cylinder cover 400, preventing the lock core frame 100 from shaking in the lock cylinder cover 400, which could otherwise affect the integrity and use experience of the trailer coupler lock.

In one embodiment, an installation groove 460 is formed in the lock cylinder cover 400, and the avoidance hole 410 is formed in the installation groove 460. The locking piece 500 is configured as an ice hockey lock, and is installed in the installation groove 460. A locking groove 510 of the ice hockey lock faces the avoidance hole 410, allowing the first locking tongue 110 and the second locking tongue 450 to extend into the locking groove 510 for locking, and to lock the lock core frame 100 inside the lock cylinder cover 400. The ice hockey lock has strong resistance to damage, hidden shackle design and excellent resistance to shearing and sawing, greatly enhancing the safety of the trailer coupler lock.

In one embodiment, a wrench groove 470 is formed in the lock cylinder cover 400. The wrench groove 470 is configured to accommodate the locking wrench 630 of the coupler 600, preventing the locking wrench 630 of the coupler from interfering with the connection between the coupler 600 and the trailer coupler lock, thereby improving the use experience and adaptability of the trailer coupler lock. Meanwhile, the locking wrench 630 of the coupler 600 is placed into the wrench groove 470, which plays a role in limiting the relative rotation between the coupler 600 and the trailer coupler lock, optimizing the use experience of the trailer coupler lock.

In one embodiment, as shown in FIGS. 17-22, the lock core frame 100 includes an engagement portion 700 and a sliding groove 120. The movable lock head 200 includes a sliding block 210 and a connector 800. The sliding groove 120 extends in the first direction x, and the sliding block 210 is slidably installed in the sliding groove 120, achieving a movable connection between the lock core frame 100 and the movable lock head 200. The connector 800 may be engaged with the spherical chamber 610 of the coupler 600, and the engagement portion 700 may be engaged with at least one surface of the coupler 600. The connector 800 is connected to the sliding block 210, and the sliding block 210 slides along the sliding groove 120 to drive the connector 800 to move, enabling the relative positions of the engagement portion 700 and the connector 800 to be adjusted to adapt to couplers 600 of different sizes and types.

When the coupler 600 is connected, the spherical chamber 610 of the coupler 600 is first engaged with the connector 800 of the lock core frame 100. Then, the sliding block 210 slides along the sliding groove 120 to drive the connector 800 and the coupler to move, so that an outer surface of the coupler 600 is engaged with the engagement portion 700 of the movable lock head 200. In this case, the engagement portion 700 and the connector 800 work together to clamp and fix the coupler 600 between the lock core frame 100 and the movable lock head 200, thereby achieving a satisfactory connection effect.

In one embodiment, as shown in FIGS. 19-22, a limiting groove 360 extending in the first direction x is formed in the sliding block 210, and both ends of the limiting groove 360 are closed. A limiting hole 370 is formed in an inner wall of the sliding groove 120. A limiting jack screw 380 is inserted into the limiting hole 370, enabling a limiting end 381 of the limiting jack screw 380 to be placed into the limiting groove 360, so that the limiting end 381 of the limiting jack screw 380 can only slide in the limiting groove 360. This limits the sliding range of the sliding block 210 in the sliding groove 120 and prevents the sliding block 210 from falling out of the sliding groove 120, thereby improving the integrity and stability of the trailer coupler lock.

It can be seen from the above description that the above embodiments have achieved the following technical effects.

1) The lock core frame 100 and the movable lock head 200 are movably connected, allowing the relative positions of the lock core frame 100 and the movable lock head 200 to be adjusted for connection of couplers 600 of different sizes and types, thereby improving the adaptability of the trailer coupler lock.

2) The lock cylinder cover 400 can protect the engagement portions 700 of the internal lock core frame 100, the movable lock head 200 and the coupler 600, preventing the external force from directly damaging the connection structure and improving the anti-theft safety. Meanwhile, the limiting piece 300 is enclosed inside the lock cylinder cover 400, preventing the relative movement between the lock core frame 100 and the movable lock head 200 due to external contact and operation of the limiting piece 300, thereby ensuring the connection stability of the coupler 600.

The above descriptions are only preferred embodiments of the present disclosure and are not intended to limit the present disclosure. It will be apparent to those of ordinary skill in the art that various modifications and variations may be made to the present disclosure. Any modification, equivalent replacement, improvement, etc., made within the spirit and principle of the present disclosure shall be included in the protection scope of the present disclosure.

The invention claimed is:

1. A trailer coupler lock, wherein a coupler has a spherical chamber, and the coupler lock comprises:
   a lock core frame comprising a connector engaged with the spherical chamber of the coupler and a first lock tongue, wherein a sliding groove extending in a first direction is formed in the lock core frame;
   a movable lock head comprising a sliding block and an engagement portion, wherein the sliding block is slidably installed in the sliding groove, the engagement portion is connected with the sliding block, the engagement portion is engaged with at least one surface of the coupler, and the engagement portion cooperates with the connector to clamp and fix the coupler;
   a limiting piece selectively connected with the lock core frame and the sliding block simultaneously to limit a position of the sliding block in the sliding groove;
   a lock cylinder cover selectively covering an outside of the lock core frame, wherein an avoidance hole is formed in the lock cylinder cover; and
   a locking piece arranged at a periphery of the lock cylinder cover, wherein the first lock tongue extends through the avoidance hole and is connected with the locking piece to lock the lock core frame inside the lock cylinder cover in response to the lock cylinder cover being arranged on the outside of the lock core frame.

2. The trailer coupler lock according to claim 1, wherein a plurality of positioning holes are formed in the sliding block in a first direction, a latch hole is formed in an inner wall of the sliding groove, and the limiting piece is a latch; and
   the latch extends through the latch hole and is inserted into the plurality of positioning holes to limit the sliding of the sliding block in the sliding groove.

3. The trailer coupler lock according to claim 2, wherein the plurality of positioning holes runs through the sliding block in a second direction, the latch hole comprises a first latch hole and a second latch hole; and
   the latch extends through the first latch hole, the plurality of positioning holes, and the second latch hole in sequence to limit the sliding of the sliding block in the sliding groove.

4. The trailer coupler lock according to claim 2, wherein the latch comprises a latch post and a latch handle connected with the latch post, an accommodating groove is formed in the lock core frame, and the latch hole is located in an inner wall of the accommodating groove and communicates with the accommodating groove and the sliding groove; and
   the latch handle is accommodated in the accommodating groove in response to the latch post extending through the latch hole and is inserted into the plurality of positioning holes.

5. The trailer coupler lock according to claim 4, wherein the latch handle is defined with a first end face; and
   in response to the latch post extends through the latch hole and being inserted into the plurality of positioning holes and the lock cylinder cover is arranged on the outside of the lock core frame, the connector, the movable lock head and the latch are all located in the lock cylinder cover, the first lock tongue extends through the avoidance hole and is connected with the locking piece, and the first end face of the latch handle abuts against a first inner wall of the lock cylinder cover.

6. The trailer coupler lock according to claim 4, wherein a plurality of latch posts are provided, and the plurality of latch posts are arranged side by side in the first direction and are configured to be inserted into the plurality of positioning holes simultaneously; and
   the number of the plurality of positioning holes is greater than the number of the latch posts.

7. The trailer coupler lock according to claim 1, wherein a retaining groove for engaging with a flange of the coupler is formed in the engagement portion.

8. The trailer coupler lock according to claim 1, wherein a limiting plate is arranged on the lock core frame, and a leveling groove is formed in the lock cylinder cover; and
   the limiting plate is accommodated in the leveling groove to limit a relative rotation between the lock core frame and the lock cylinder cover in response to the lock cylinder cover being arranged on the outside of the lock core frame.

9. The trailer coupler lock according to claim 1, wherein the lock core frame further comprises a second panel, a second inner wall is arranged in the lock cylinder cover, and the second panel abuts against the second inner wall in response to the lock cylinder cover being arranged on the outside of the lock core frame.

10. The trailer coupler lock according to claim 1, wherein the second panel is arranged at a second end of the sliding groove to prevent the sliding block from falling out of the sliding groove.

11. The trailer coupler lock according to claim 1, wherein a second lock tongue is arranged on the lock cylinder cover, and the locking piece locks the first lock tongue and the second lock tongue tightly in response to the first lock tongue extending through the avoidance hole.

12. The trailer coupler lock according to claim 1, wherein an installation groove is formed in the lock cylinder cover, and the avoidance hole is formed in an inner wall of the installation groove; and
   the locking piece is configured as an ice hockey lock, and the locking piece is accommodated in the installation groove in response to the locking piece locking the first lock tongue.

13. The trailer coupler lock according to claim 1, wherein a wrench groove is formed in the lock cylinder cover to accommodate a locking wrench of the coupler.

14. A trailer coupler lock, wherein a coupler has a spherical chamber, and the coupler lock comprises:
   a lock core frame having an engagement portion and a first lock tongue, wherein the engagement portion is engaged with at least one surface of the coupler, and a sliding groove extending in a first direction is formed in the lock core frame;

a movable lock head comprising a sliding block and an engagement portion, wherein the sliding block is slidably installed in the sliding groove, a connector is connected with the sliding block and engaged with the spherical chamber of the coupler, and the engagement portion cooperates with the connector to clamp and fix the coupler; a limiting piece selectively connected with the lock core frame and the sliding block simultaneously to limit a position of the sliding block in the sliding groove;

a lock cylinder cover selectively covering an outside of the lock core frame, wherein an avoidance hole is formed in the lock cylinder cover; and a locking piece arranged at a periphery of the lock cylinder cover, wherein the first lock tongue extends through the avoidance hole and is connected with the locking piece to lock the lock core frame inside the lock cylinder cover in response to the lock cylinder cover being arranged on the outside of the lock core frame.

15. The trailer coupler lock according to claim 14, wherein a limiting groove extending in the first direction is formed in the sliding block, and a limiting hole is formed in an inner wall of the sliding groove; and a limiting jack screw is inserted into the limiting hole, and a limiting end of the limiting jack screw is placed into the limiting groove to prevent the sliding block from falling out of the sliding groove.

\* \* \* \* \*